United States Patent [19]

Harvey et al.

[11] Patent Number: 5,023,563

[45] Date of Patent: Jun. 11, 1991

[54] UPSHIFTED FREE ELECTRON LASER AMPLIFIER

[75] Inventors: Robin J. Harvey, Thousand Oaks, Calif.; A. Jay Palmer, Longmont, Colo.

[73] Assignee: Hughes Aircraft Company, Los Angeles, Calif.

[21] Appl. No.: 589,702

[22] Filed: Sep. 24, 1990

Related U.S. Application Data

[63] Continuation-in-part of Ser. No. 363,665, Jun. 8, 1989, abandoned.

[51] Int. Cl.$^5$ .............................. H01S 3/09; H01S 3/14
[52] U.S. Cl. ........................................ 330/4.3; 372/2; 315/3.6; 315/5.43; 331/94.1
[58] Field of Search ................... 330/4, 4.3; 372/2; 315/3.6, 5.43; 331/94.1

[56] References Cited

U.S. PATENT DOCUMENTS

| | | | |
|---|---|---|---|
| 4,287,488 | 9/1981 | Brou et al. | 330/4.3 |
| 4,331,936 | 5/1982 | Schlinger et al. | 372/2 |
| 4,479,219 | 10/1984 | Madey | 372/2 |
| 4,511,850 | 4/1985 | Schlitt et al. | 372/2 |
| 4,697,272 | 9/1987 | Harvey | 372/96 |
| 4,745,617 | 5/1988 | Harvey | 372/96 |
| 4,809,281 | 2/1989 | Neil et al. | 372/2 |

OTHER PUBLICATIONS

Davidson et al., "Higher Harmonic ... Wiggler"; Phys. Rev. A., vol. 26, #4, pp. 1997-2003, 10/82.
Smith et al., "UK Free-Electron Laser Proposal", 2 vol. Public of Addison-Wesley, 6/25/81, pp. 275-259.
M. C. Wang et al., "The Gain and Efficiency Improvement of a Free-Electron Laser by an Optical Klystron Configuration" IEEE Transactions on Plasma Science, vol. 16, No. 2, pp. 172-176, Apr. 1988.
A. K. Ganguly et al., "High Efficiency Operation of Free-Electron Laser Amplifier" IEEE Transactions on Plasma Science, vol. 16, No. 2, pp. 167-171, Apr. 1988.
C. Hih et al., "Two-Element Free-Electron Lasers", Optics Letters, vol. 5, No. 2, pp. 76-78, Feb. 1989.
P. Elleaume, "Optical Klystrons", Journal De Physique, Colloque Cl, No. 2, Tome 44, pp. Cl-333—Cl-352, Feb. 1983.
R. Coisson, "Optical Klystrons", Particle Accelerators, vol. 11, pp. 245-253, 1981.

Primary Examiner—Nelson Moskowitz
Attorney, Agent, or Firm—V. D. Duraiswamy; W. K. Denson-Low

[57] ABSTRACT

A method is disclosed of employing free electron lasing action at a first frequency to achieve gain in output power at a second frequency. In a broadest sense, an electron beam is driven with an electromagnetic wave at said first frequency in a first stage, having a first spatial period, to cause bunching of the electron beam. The electrons in the beam are oscillated with a second stage, having a second spatial period, to generate electromagnetic wave power from said beam at the second frequency.

In a specific embodiment, the second frequency is near a harmonic of said first frequency. And in a particular implementation, the first stage is provided by a free electron laser having a first wiggler with a first spatial period, the second stage is a second wiggler having a second spatial period and a drift region is disposed between the first and second stages.

10 Claims, 4 Drawing Sheets

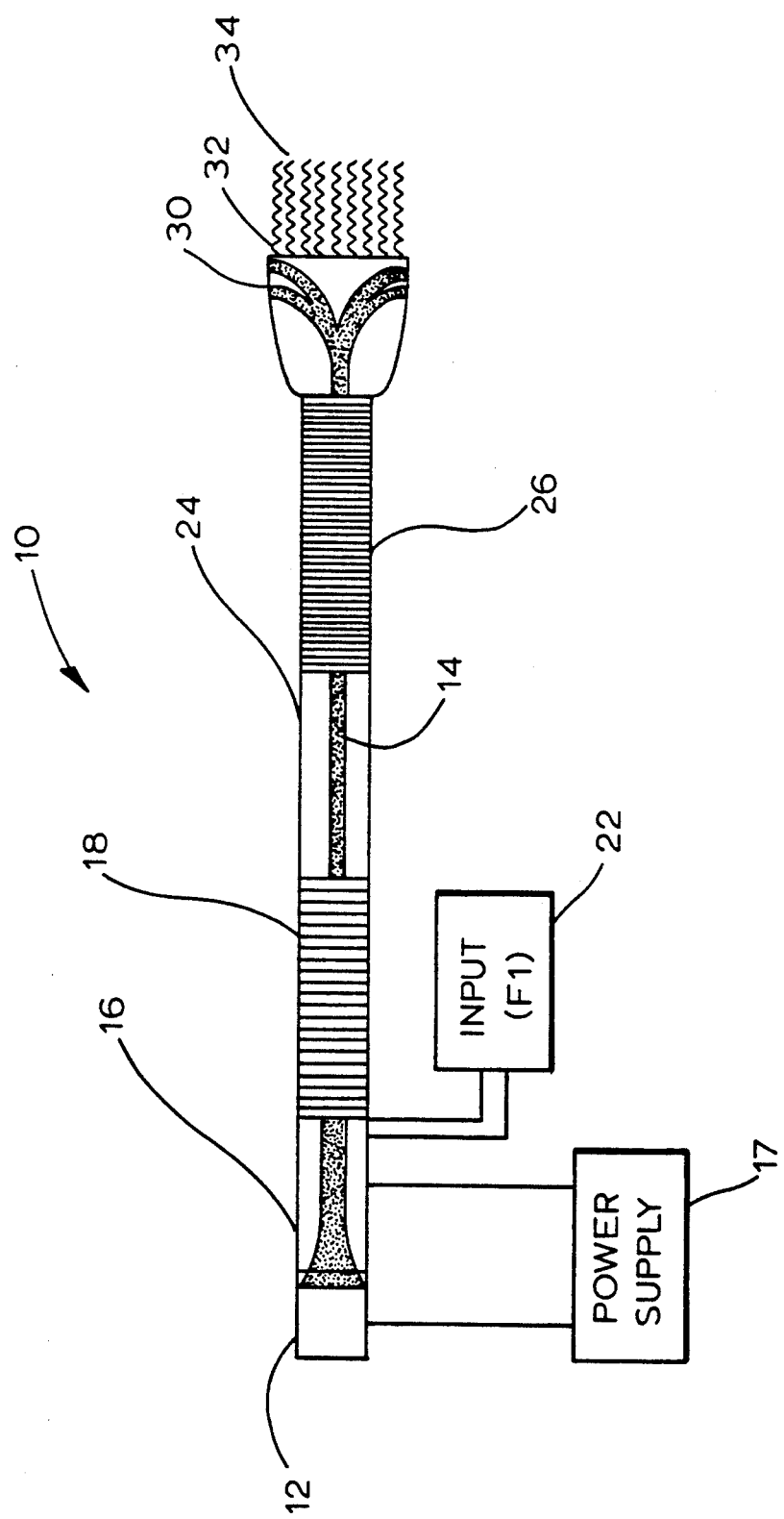

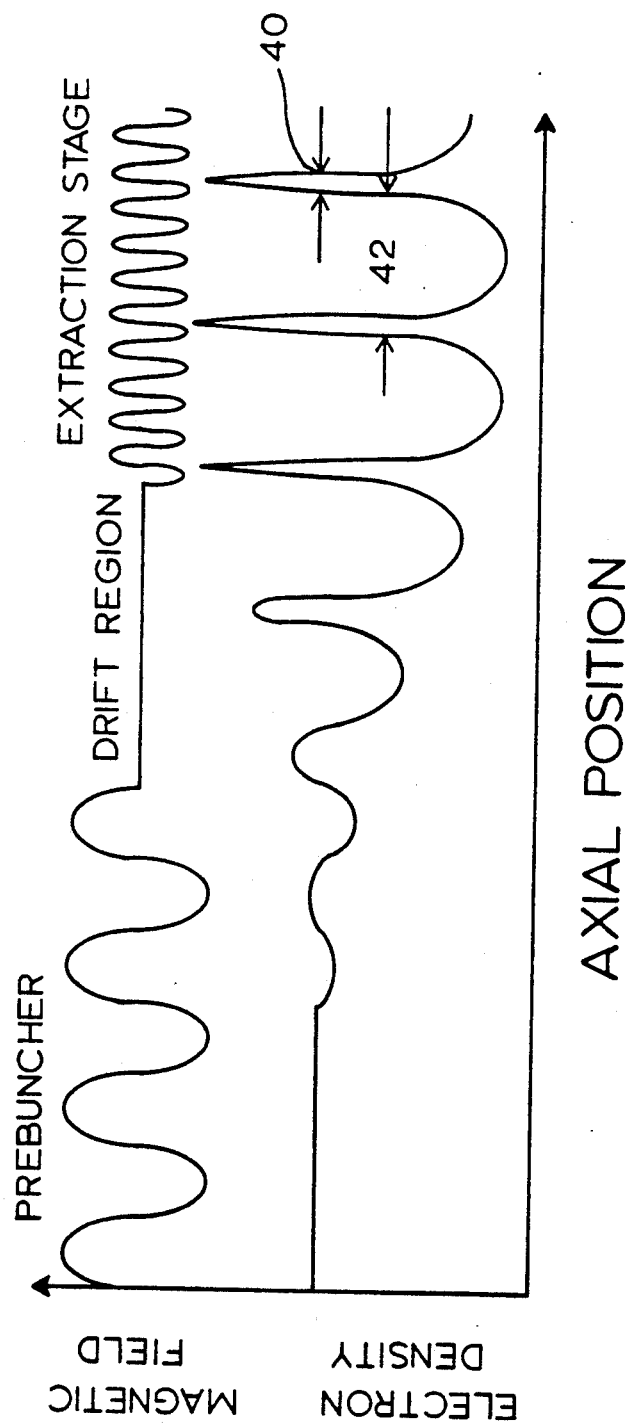

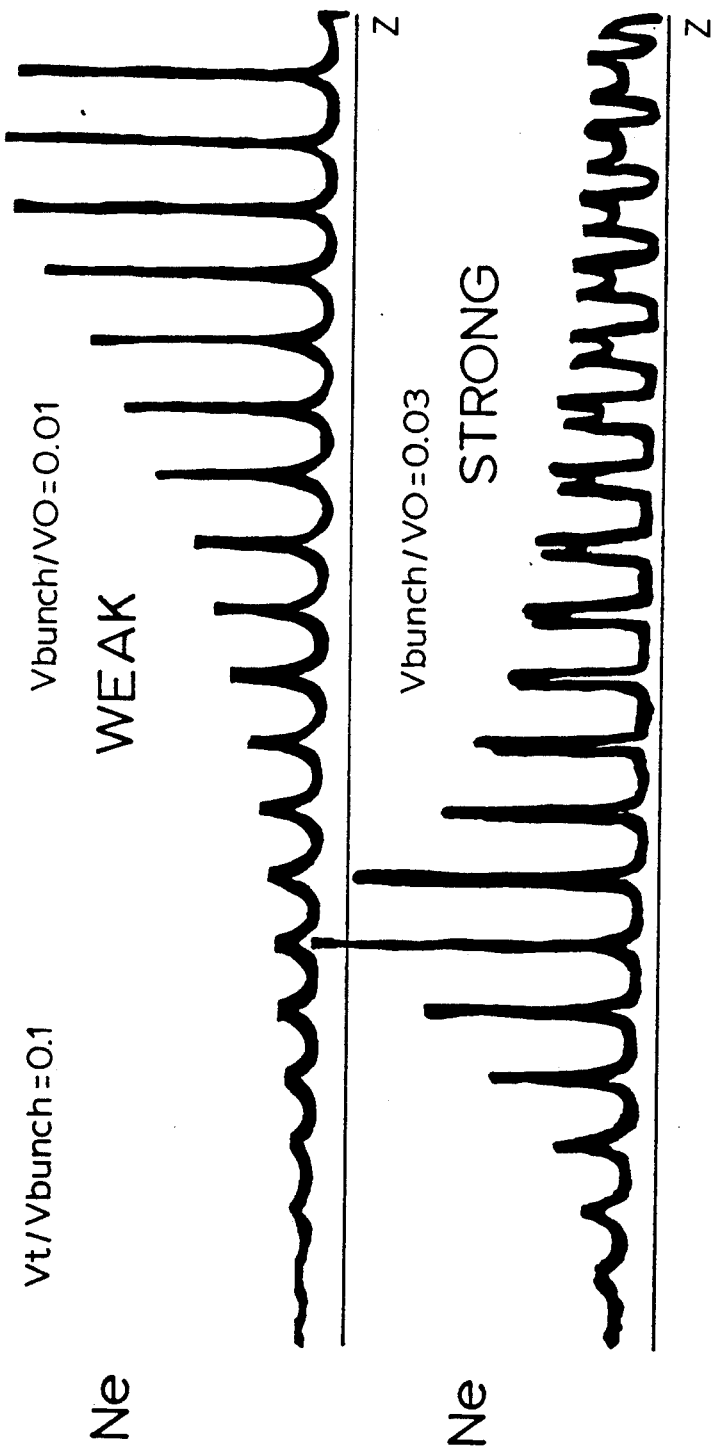

UPSHIFTED FREE ELECTRON LASER AMPLIFIER

This invention was made with U.S. Government support under Contract No. N00014-87-C-0403 awarded by the Department of the Navy. The Government has certain rights in this invention.

This is a continuation-in-part of application Ser. No. 07/363,665, filed June 8, 1989, by R. J. Harvey et al., for UPSHIFTED FREE ELECTRON LASER AMPLIFIER now abandoned.

BACKGROUND OF THE INVENTION

1. Field of the Invention

The present invention relates to free electron lasers. More specifically, the present invention relates to fast wave amplifiers and oscillators analogous to two stage free electron lasers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

A free electron laser (FEL) is a device in which a beam of electrons is passed through a spatially varying magnetic field. The magnetic field causes electrons in the beam to "wiggle" and radiate energy. Shorter period wigglers or higher voltage give rise to higher radiated frequencies. Unfortunately, FELs have heretofore been successfully operated only when the combination of wiggler field strength and period, the current, and the voltage produce sufficient gain to lase. Attempts to lower the operating voltage for the same frequency results in a low gain. While it is generally recognized that the gain of an FEL can be improved by increasing the length of the laser, adequate length for sufficient gain for some current applications would require an FEL of excessive length. This would also undesirably reduce the band width and efficiency of the FEL.

Recently, a technique called "prebunching" has been used to increase the coupling efficiency of FELs configured as optical klystrons. (See "The Gain and Efficiency Improvement of a Free-Electron Laser by an Optical Klystron Configuration", by M. C. Wang, V. L. Granatstein and B. Levush, in IEEE Transactions on Plasma Science, vol. 16, no. 2, April 1988, pp. 172-176.) As explained in McGraw Hill's *Concise Encyclopedia of Science and Technology* published in 1984, page 957, an optical klystron is an evacuated electron-beam tube in which an initial velocity modulation imparted to electrons in the beam results subsequently in density modulation of the beam. A klystron may be used either as an amplifier in the microwave region or as an oscillator. For use as an amplifier, a klystron receives microwave energy at an input cavity through which the electron beam passes. The microwave energy modulates the velocities of electrons in the beam, which then enter a drift space. Here the faster electrons overtake the slower electrons to form bunches. In this manner, the uniform current density of the initial beam is converted to ac (alternating current). The bunched beam with its significant component of alternating current then passes through an output cavity to which the beam transfers its ac energy.

In accordance with the teaching of Wang et al. the wiggler field is broken into two or more parts, the first is known as the "prebuncher" and is separated from the output stage by a drift region. The prebuncher functions to impose a velocity modulation on the electron beam that gradually grows into a density modulation in the electron beam downstream. A drift or dispersive region is used to convert the velocity modulation into density bunches of the optimal phase with respect to the second portion of the wiggler field known generally as the "output" or the "extraction" wiggler. The technique can be used to maximize either the efficiency or gain of the FEL.

In any event, in this device, the input and output frequencies and the wiggler spatial periods are the same in each stage. As the output frequency is a function of the energy in the beam and the spatial period of the wiggler, higher operating frequencies could be achieved in this device only by increasing the energy in the beam, viz., the operating voltage or by reducing the wiggler period. Unfortunately, the wiggler period strongly affects the strength and spatial distribution of the magnetic field, through a $1/\cosh(kr)$ functional form, and improvements far beyond the state of the art are not practical. In addition, for some applications, the size, weight, cost, reliability considerations, complexity, associated x-ray emission and need for a high voltage control system mitigate against higher voltages and indeed limit the extent to which the energy in the beam can be increased within the parameters of the host system. Hence, the bandwidth of such devices is somewhat limited.

In short, to increase the gain of conventional FELs longer, larger devices are required, while increases in the operating frequencies of these devices generally require higher operating voltages. Thus, for certain applications, there is a current need in the art for a transmitter of the free electron laser type which is compact and lightweight having wideband agility, large gain and minimal power requirements.

SUMMARY OF THE INVENTION

The need in the art is addressed by the present invention which provides a method of employing free electron lasing action at a first frequency to achieve gain in output power at a second frequency. In a broadest sense, an electron beam is driven with an electromagnetic wave at the first frequency in a first stage, having a first spatial period, to cause bunching of the electron beam. The electrons in the beam are oscillated with a second stage, having a second spatial period, to generate electromagnetic wave power from the beam at the second frequency.

In a specific embodiment, the second frequency is a harmonic of the first frequency. And in a particular implementation, the first stage is provided by a free electron laser having a first wiggler with a first spatial period, the second stage is a second wiggler having a second spatial period and a drift region is disposed between the first and second stages. The prebunching wavelength can be selected to be much longer than the output wavelength, enabling an amplifier mode of operation where the output frequency is a multiple of the input frequency.

The invention may be regarded as providing a fast wave amplifier using prebunching to enhance the coupling strength of a short-wavelength wiggler. Shorter wavelengths should be achievable with less wiggler field and lower operating voltage. The net gain of small signals should be higher permitting the design and construction of tunable amplifiers (and oscillators) having wide bandwidth and large gain, for small saturated powers, and short physical length. In addition to providing more compact sources of millimeter-wave to infrared radiation, FELs designed in accordance with the present teachings should be smaller with lighter power supplies. Due to the effective multiplication of the prebunching frequency by an FEL designed in accordance with the present teachings, it is further anticipated that such an FEL may be used as a frequency-multiplying amplifier.

BRIEF DESCRIPTION OF THE DRAWINGS

FIG. 1 shows an illustrative embodiment of an up-shifted free electron laser (UFEL) implementing the advantageous method of the present invention.

FIG. 2 provides comparative representations of magnetic field strength and associated electron density as a function of axial position in the UFEL of the illustrative embodiment.

FIGS. 3a shows an analytically derived plot of the electron density of an FEL, as a function of axial position z, in response to a weak bunching impulse.

FIG. 3b shows an analytically derived plot of the electron density as a function of axial position z, in the extraction stage wiggler within the FEL of the present invention, in response to a strong bunching impulse.

DESCRIPTION OF THE INVENTION

Figure 4A:
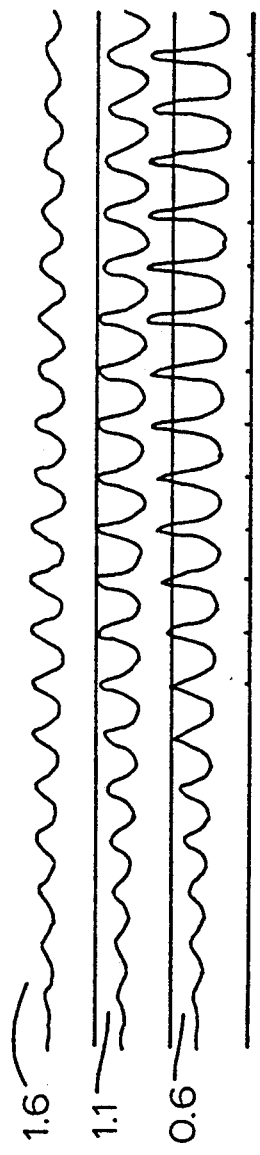
FIGS. 4a and 4b show an analytically derived plot of the electron density as a function of position Z, in the extraction stage wiggler within the FEL of the present invention, in response, respectively, to weak and strong bunching impulse in the presence of varying beam temperatures.

Illustrative embodiments and exemplary applications will now be described with reference to the accompanying drawings.

As shown below and discussed above, conventional free electron lasers have an output frequency which is a function of input energy. The wiggling force F on an electron is given by the cross product of equation [1] below:

$$F = ev \times B_w \quad [1]$$

where
- $e$ = the charge on the electron,
- $v$ = the velocity of the electron and
- $B_w$ = the intensity of the magnetic field generated by the wiggler. The magnetic field of the 25 wiggler is of sufficient strength to cause the electrons to rapidly change direction or "wiggle" back and forth as they pass through the cavity of the laser.

As is well known in the art, the wiggling is tantamount to accelerating the electrons. The rapid acceleration of the electrons causes the electrons to release synchrotron radiation. Thus, each electron sees a field due to synchrotron emission and radiation due to any signal injected into the cavity. Thus, the total force on the electron includes components due to the wiggler and to the signal:

$$\begin{aligned} F &= ev \times (B_w + B_s) + eE_s \\ &= e(V_o \times B_w + v\perp \times B_s) + eE_s \end{aligned} \quad [2]$$

where
- $B_s$ = the transverse magnetic field due to the signal,
- $v_o$ = the original axial velocity of the electron,
- $v\perp$ = the transverse velocity of the electron, and
- $E_s$ = the strength of the electric field of the signal wave.

The $v\perp \times B_s$ term represents a force in the axial direction and may be expressed as follows:

$$v\perp \times B_s = \cos(k_w z)\cos(k_s z - \omega_s t) \quad [3]$$

where the term $\cos(k_w z)$ represents $v\perp$, the term $\cos(k_s z - \omega_s t)$ represents $B_s$, and the wiggler wavenumber $k_w$ is represented as $k_w = 2\pi/\lambda_w$.

As the longitudinal position of the electron is given by equation [4] below, $$z = v_z t + \phi/kw \quad [4]$$

$v_z$ = axial velocity in the direction of the electron beam, and $\phi$ is a phase factor representing the relative time of entry of the electron into the wiggler, if $\phi$ equation [3] may be expressed as:

$$v\perp \times B_s \rightarrow \cos(k_w v_z t + \phi)\cos([k_s v_z - \omega_s]t) \quad [5]$$

Thus, if the velocity or the electron and the signal frequency are equal, that is, if equation [6] below is satisfied, $$-k_w v = k_s v = \omega_s \quad [6]$$

and $\phi = 0$ the term $v\perp \times B_s$ will equal $\cos^2(k_w vt)$ and it will have a nonzero average for electrons entering at time $t = 0$. In general, this term represents the ponderomotive force and represents the extent to which an electron is slowed or accelerated by the field in the cavity depending on the phase factor $\phi$. The result is that some electrons in the beam will travel faster than others. If the cavity is long enough, the fast electrons will overtake the slower electrons, those entering at time other than $t = 0$, and will be bunched.

The bunched electrons will emit synchrotron radiation in phase. That is, the radiative emissions of the electrons will be coherent and superimpose on each other in the far field. When this occurs, the intensity of the synchrotron radiation goes up as a square of the number of electrons instead of the mere sum, as would be the case with no bunching. Thus, to achieve bunching, the FEL would be operated at a frequency at which the input frequency is at or close to the value satisfying equation [6] for the value of the velocity of the electrons in the electron beam.

For conventional FELs it may be shown that the signal frequency is approximately related to the wiggler frequency in terms of wavenumbers:

$$k_s = k_w \beta/(1 \pm \beta) \quad [7]$$

where
- $k_s$ = the signal wavenumber (proportional to the frequency of the radiation field),
- $k_w$ = the wiggler wavenumber, and $\beta$ = the velocity v divided by the speed of light constant c.

The coefficient $\beta/(1\pm\beta)$ represents the doppler shift of the limited wavenumber relative to the wiggler wavenumber. Thus, for the negative sign, in equation 7, as the operating voltage is increased, the energy in the beam is increased, the electron velocity v approaches the speed of light, $\beta$ approaches unity the denominator approaches zero, the coefficient $\beta/(1-\beta)$ gets larger, and the frequency of the radiation field $k_s$ is higher for higher operational voltages and for higher wiggler frequencies.

As mentioned above, there are practical limitations on the extent to which the voltage of the system may be increased, i.e., size, weight, cost, and etc. Likewise, there are limits on the extent to which the wavenumber of the wiggler $k_w$ may be increased. That is, a certain magnetic field strength B is required for sufficient gain for practical operation of the laser. As the wavenumber of the wiggler is increased, the magnetic field strength B falls off exponentially (as $e^{-2k_w R}$ where R is the size of the radius of the wiggler magnets) and the strength of the interaction drops rapidly. Thus, the electron beam must be small and close to the wiggler (which also must be small) to make the wiggler period arbitrarily small. That is the electron optics must be smaller in cross-section. (on the order of a half wiggler period) and are therefore more delicate and difficult to fabricate. This also, makes it difficult to propagate the beam through the wiggler. Likewise the available power from the FEL is limited by the small cross-section. Thus, there has been a need in the art for a technique for increasing the frequency of the radiation field without increasing the operating voltage nor the frequency of the wiggler.

As mentioned above and as discussed more fully below, the present invention provides a method of employing free electron lasing action at a first frequency to achieve gain in output power at a second frequency. That is, an electron beam is driven with an electromagnetic wave at the first frequency (typically a fundamental) in a first stage wiggler, having a first spatial period. The first stage wiggler causes prebunching of the electron beam. Electrons in the beam are oscillated with a second stage wiggler, having a second spatial period, to generate electromagnetic wave power from the beam at the second frequency typically but not necessarily near a harmonic of the fundamental.

Ordinarily, FEL laser gain due to pondermotive coupling into the system at the fundamental frequency is on the order of 10% or so for an FEL oscillator. Lower gain at a harmonic has traditionally been very much smaller with the exception of very high voltage lasers. Thus, at the harmonic frequencies, the gain is low and lasing is difficult to achieve. The bunching of harmonics would require an FEL of inordinate length, where quenching of the coupling interaction, due to the thermal spread of the electron velocities would further diminish the gain. However, prebunching, is used in the present invention to provide higher radiation field frequencies $k_s$ without increasing the operating voltage, the primary wiggler frequency or substantially increasing the length of the laser.

FIG. 1 shows an illustrative embodiment of a two-stage upshifted free electron laser (UFEL) 10 implementing the advantageous method of the present invention. The laser 10 includes an electron gun 12 which provides an electron beam 14. The beam 14 is accelerated by an accelerator 16 and injected into a prebuncher 18. The electron gun 12 and the accelerator 16 are energized by a power supply 17. The prebuncher 18 may be realized with a conventional FEL wiggler magnet. The prebuncher 18 includes an internal resonant cavity 20 (not shown). In the preferred embodiment, the resonant cavity 20 of the prebuncher 18 is designed in accordance with the teachings of U.S. Pat. No. 4,697,272, issued September 29, 1987, and U.S. Pat. No. 4,745,617, issued May 17, 1988, to R. J. Harvey. (The teachings of these patents are incorporated herein by reference.) The resonator matches to a frequency defined by the speed of the electron beam and the period of the FEL through the approximate FEL equation:

$$f_1 = c\beta/\lambda_{w1}(1\pm\beta) \qquad [8]$$

where c is the speed of light, $\beta$ is the relativistic velocity (velocity/c), and $\lambda_{w1}$ is the spatial period of the wiggler magnet. Two basic options exist for the prebuncher 18: 1) to resonate at $f_1$ as in a conventional FEL oscillator using resonant cavity 20 or 2) to be pumped as an FEL amplifier by an external source 22 that supplies a sufficiently strong signal at frequency $f_1$ to cause bunching in prebuncher 18 proportional to the input signal $f_1$. In any event, the prebuncher 18 imparts a velocity modulation on the electron beam 14.

A drift section 24 is provided at the output of the prebuncher 18. The drift section 24 may incorporate additional focusing coils and phase adjusting electrodes. While passing through the prebuncher 18 and the drift section 24, the electron beam 14 becomes bunched in the axial (longitudinal) direction as discussed above. A second wiggler magnet (the "extraction stage" wiggler) 26 is provided at the output of the drift section 24. As is evident in FIG. 1, the electron gun 12, accelerator 16, prebuncher 18, drift section 14 and extraction stage wiggler 24 are generally in alignment in the longitudinal direction.

In accordance with the present teachings, the extraction stage wiggler 26 is designed such that the spatial period thereof $\lambda_{w2}$ is different from that $\lambda_{wl}$ of the prebuncher 18. As such, a UFEL constructed in accordance with the present teachings is capable of operation in an amplifier mode or in an oscillator mode.

In the illustrative embodiment, the UFEL is designed as an amplifier and the spatial period $\lambda_{w2}$ of the extraction stage wiggler 26 is chosen to be shorter than that of the prebuncher 18. The extraction stage wiggler 26 acts upon the prebunched electrons as a pre-seeded buncher from which to extract radiative power at a higher frequency, $f_2$, and to some extent, to continue bunching the electron beam at a shorter wiggler period. As discussed below, prebunching can markedly increase the gain and efficiency of the FEL. It must be noted that two limits exist for the strength of the conventional FEL gain in the extraction stage. If the strength of the gain is close to the threshold for conventional lasing action, then prebunching will enable true lasing action with additional bunching taking place within the extraction stage. If the strength of the conventional FEL gain is weak then the UFEL will still exhibit power at $f_2$ with an effective gain that is proportional to the signal field strength in the prebuncher at f1. These two limits will be discussed below.

The wavenumber of the fundamental bunch period at the entrance to the extraction stage 26 is given in the laboratory frame of reference by:

$$k_{b1} = k_1 + k_{w1} \quad [9]$$

where $k_{b1}$ = wavenumber of the fundamental bunch period at the entrance to the extraction stage, $k_1 \approx 2\pi f_1/c = 2\pi/\lambda_1$ and $\lambda_1$ is the wavelength of the radiation present in the prebuncher 18.

$k_{w1} = 2\pi/\lambda_{w1}$ when $\lambda_{w1}$ is the spatial period of the wiggler magnet of the prebuncher 18.

FIG. 2 provides comparative representations of magnetic field strength and associated electron density as a function of axial position in the UFEL 10 of the illustrative embodiment. As shown in FIG. 2, bunching can lead to a focusing of the electrons into narrowly defined regions 40 that are smaller than the wavelength of the fundamental bunch period 42. Consequently, the spatial distribution of the electrons includes harmonic content that can be intense enough to cause (e.g. by seeding or priming in the case of a strong conventional FEL gain at $f_2$) lasing action at a higher frequency in the extraction section 26 than is used to cause prebunching in the prebuncher 18.

FIGS. 3a shows an analytically derived plot of the intensity of the electron density $n_e$ in an FEL, as a function of axial position z, in response to a weak bunching impulse and neglecting repulsive spacecharge forces (i.e. in the so called Compton regime). FIG. 3b shows an analytically derived plot of the intensity of the electron density $n_e$ as a function of axial position z, in the drift regime and extraction stage wiggler within the FEL of the present invention, in response to a strong bunching impulse. As indicated in FIGS. 3a and 3b, a weak bunching impulse, in contrast to a strong impulse, causes the bunching to develop slowly over a long distance and results in a tighter focusing over a relatively long length. A stronger bunching impulse focuses the electrons earlier, and causes the electrons to over run each other. This generates a more complex spatial structure with a complex phasing of harmonic modes. A weak bunching and long drift region may be desirable in coupling to a specified higher-order wiggler in the output stage. However, spacecharge and thermal effects also affect bunching and focusing of the electrons downstream. Several examples of the thermal effects are shown in the upper half of FIG. 4 for weak bunching and relative values of the thermal velocity $V_t$ ranging from above to below the impulse velocity $V_{bunch}$. Stronger bunching is represented in the lower half of the figure, while the horizontal scale is spread out to display more detail of the narrowing of the bunches at low temperature. Typically, strong harmonic content in the beam bunches requires a bunch-impulse velocity above the mean thermal velocity, $V_b > V_t$.

If the extraction wiggler 26 were used as a single stage FEL, the parametric relationships of the frequency, wiggler wavenumber, velocity and bunching period would follow the same relationships as equations [8] and [9] above. That is, $$f_2 = c\beta/\lambda_{w2}(1-\beta) \quad [10]$$

and $$k_{b2} = k_2 + k_{w2} \quad [11]$$

where $k_{b2}$ = wavenumber of the mean bunch period at the output of the extraction stage 26, $k_2 = 2\pi/\lambda_2$ and $\lambda_2$ is the wavelength of the signal wave in the extraction stage 26.

$k_{w2}$ = the wavenumber of the wiggler magnet of the extraction stage 26.

Consequently, the gain of the extraction section 26 is assumed to be at a maximum when the bunching spacing present in the extraction section 26 due to prebunching matches the required bunching spacing for normal lasing action. The bunching wavenumbers do not need to be equal. Heuristically, as is evident with reference to FIGS. 2, 3 and 4, the total number of electrons contributing to coherent emission in the second stage can be high and the coupling strength may be evaluated quantitatively by taking the Fourier transform of the electron beam density, due to the prebunching, at the $k_{b2}$ wavenumber.

The above discussion assumes an impulse force in the prebuncher. In a normal FEL, the presence of laser power over a long gain path can act to dephase the evolving electron bunches before they reach a desired "deep-bunch" condition. Hence, the saturated power and efficiency are not optimal. In accordance with the present invention, the prebunching signal power, $f_1$, or other parameters such as the wiggler strength in the prebuncher or the drift length may be adjusted such that an optimum bunching strength can be achieved at the entrance to the second wiggler and maximal power can be extracted at $f_2$ over a relatively short interaction length. Since the efficiency of the conventional FEL depends upon the inverse of the length of the wiggler the UFEL offers significant improvements in efficiency.

Figure 4B:
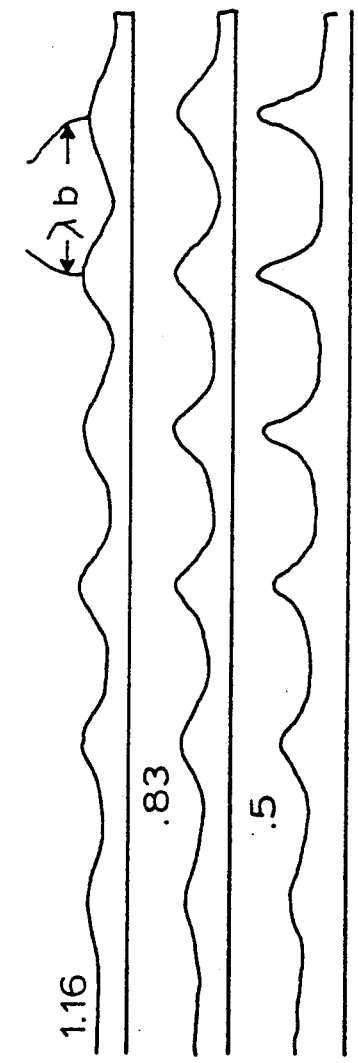

From the point of view of optimal matching of bunches, as seen in FIGS. 2, 3 or 4, an optimum ratio of wavenumbers is generally an integer number, N where $$N = k_{b2}/k_{b1} \quad [12]$$

The maximum N is limited by the requirement that the bunching be sufficiently deep to tightly focus the electrons within the period required of the normal bunches in the second stage. Gain enhancement may be present even if the ratio is not an integer and even in the presence of the unavoidable heating of the beam due to the prebunching action. Additionally, this condition may be somewhat different in the strong bunch or Raman regimes, and the optimum is determined by applying a Fourier transfer to the prebunch spectrum. In either case, a frequency $f_2$ is generated in the extraction wiggler section 26 that is proportionately higher than the frequency $f_1$ present in the prebuncher section 18. In effect, the input signal at frequency $f_1$ is frequency shifted and amplified.

As mentioned above, the frequency $f_2$ might eventually grow in intensity without prebunching, but the length of the interaction region would have to be considerably longer, and the thermal velocity of the electrons would have to be relatively small or (as in the case of the oscillator for example) the extraction section could not lase. By prebunching, the low-gain region of the FEL is replaced and the signal growth is more rapid. Furthermore, the length of the interaction section determines the maximum efficiency of the laser due, in part, to dephasing induced by lasing action while the conventional FEL bunches are growing in depth. By reducing the required length of the extraction section wiggler, the available output power at $f_2$ is increased. The UFEL will operate, even if the wiggler strength in the extraction stage cannot by itself induce lasing action. In this case the effective gain can be high even with a short wiggler length.

As is true with respect to the prebunching section 18, two basic options exist for operation of the extraction section 26:

a) as an amplifier where input signals (from a source such as the input source 22) are injected (at frequency $F_2$) from an external source, amplified and emitted out of the antenna end of the extraction section 26 or b) as an oscillator where the signal $f_2$ grows within a resonant cavity within the extraction section 26.

The electron beam is retained by a beam collector 30 attached to the antenna end of the extraction wiggler 26. Depending on the application and the configuration of the device, the collector 30 may include a window 32 through which a laser beam may pass to a quasi-optical antenna (not shown) and provide an output signal $f_2 = Nf_1$. In the alternative, the spent electron beam may be dissipated on the side walls of an antenna section 34 or collected in a depressed collector of the type described by Harvey, Dolezal and Parazzoli in IEEE J. Quantum Electron, QE-19, 1983, pp. 309.

The underlying interaction mechanisms are the same pondermotive force interaction and resulting coherent synchrotron emission effects that are present in a conventional FEL. That is, the electrons are oscillated by the periodic magnetic force of the wiggler magnet, and by the fields of the traveling electromagnetic wave. The induced wiggle motion in the transverse direction then couples (to higher order) with the fields to act to drive the electrons in the axial direction. On the average, the net force is toward the nulls of the beat wave as seen by the electrons. When the velocity of the electron beam is synchronized to the velocity of the beat wave, the pondermotive force produces a maximum bunching of the electrons. Qualitatively, the bunching may be described as starting with a velocity modulation, $\Delta v \cos(\omega t)$, that then manifests itself downstream as a variation in density given, for example, by equation [13] below:

$$\Delta n = n \int dv$$
$$exp((v-v_0-\Delta v \cos(\omega(z/v-t)))^2/2V_t^2)/(2\pi V_t^2)^{\frac{1}{2}} \quad [13]$$

where $V_t$ is the terminal velocity and the integral is over all phase-space velocities v. In the cold limit for small values of z, $$\Delta n \approx n v_0/v(\omega(t-z/v)) \approx n/(1-\omega z \Delta v/v_0^2$$
$$\sin(\omega(t-z/v_0))) \quad [14]$$

As indicated in FIG. 2, the bunches grow in magnitude and narrow as the beam moves in the downstream direction. Sufficiently far downstream, the variation becomes strong unless disturbed by thermal or electrostatic effects. The Fourier transform of the density shown in equation 14 exhibits harmonics of the fundamental period even though the prebuncher is composed of a single wiggler period and electromagnetic wave.

When the strongly bunched beam enters the periodic wriggler field, in wriggler 26, a significantly large fraction of the transversely oscillating electrons 25 (responding to the shorter period wiggler field) are at locations which correspond to where the bunches would normally be in a lasing FEL of the same output frequency and wiggler period. As seen in FIG. 2, not all of the shorter period bunch locations are filled, but a substantially large fraction of the of electrons are active, i.e. are in the necessary phase synchronous position needed to drive the higher frequency electromagnetic wave at frequency $f_2$. This is true even though the prebunching period is relatively long.

With no feedback and no injected signal at $f_2$, the generation of electromagnetic power in the extraction section 26 is of the spontaneous emission type caused by the coherent synchrotron emission of the bunched electrons moving through the wiggler. When feedback is present the spectrum of the emitted frequency will be determined by the properties of the cavity resonance. In the amplifier case, when a signal is injected, the FEL responds immediately.

Amplification or lasing action in the weak conventional gain limit is of significant interest. Instead of depending upon a functional form of the type:

$$dP/dt = \Gamma P - Losses\ P \quad [15]$$

for an FEL, where P is the signal power, $\Gamma$ is the equivalent power growth rate and Losses P represents the power losses, the growth of the UFEL power, $P_2$, depends upon the wave amplitude (square root of $P_2$) and the amplitude of the prebuncher signal wave $A_1$.

$$dP_2/dt = a|A_1|P_2^{\frac{1}{2}} + \Gamma_2 P - Losses\ P_2 \quad [16]$$

where a is a proportionality constant and $\Gamma_2$ represents the normal FEL gain of wiggler 26 that would be present without prebunching. The equivalent total growth rate $\Gamma_T$ then varies as:

$$\Gamma_T = aA_1/P_2^{\frac{1}{2}} + \Gamma_2 \quad [17]$$

Consequently the effective small signal gain is very large.

Neglecting $\Gamma_2$, the saturated power in the extraction section is determined by $\Gamma_T = Losses$, or $$P_2 = (aA_1/Losses)^2 \quad [18]$$

An important result is that the saturated power scales proportionally to $A_1^2$, the power in the prebuncher section. Consequently the system 10 is a linear power amplifier. By keeping the cavity losses low at frequency $f_1$, the power $P_2$ can be generated with an efficiency approaching the efficiency of the basic FEL.

The above description of the invention assumes for mathematical simplicity that the signal wave is not influenced by the present of a waveguide or cavity. However, the detailed design and function of the wiggler magnets is significantly affected by dispersion in the waveguide.

Specifically, equations [7], [8] and [10] above, for the frequencies $f_1$ and $f_2$, are valid only if the magnitude of the cutoff wavenumber, $k_{ci}$, of the waveguide may be taken to be negligibly small with respect to the respective prebuncher and signal wavenumbers, $k_1$ and $k_2$. In the above simplified case, $k_1$ and $k_2$ are identical to their respective free-space values $k_{si} = \omega_i/c = 2\pi f_i/c$ where i=1 or 2.

More generally, the FEL dispersion in a waveguide is given by:

$$k_{si} = \beta(k_{si}\cos(\theta_i) + k_{wi}) \quad [19]$$

where $$\cos(\theta_i) = \pm(1-(k_{ci}/k_{si})^2)^{\frac{1}{2}} \quad [20]$$

$\theta$ is equal to the angle between the direction of propagation of the wave and the waveguide wall and the axial wavenumber within the waveguide is given by the expression $k_{si}\cos(\theta_i)$. See equations 8 and 11 of the earlier-referenced U.S. Pat. No. 4,697,272. The $\pm$ sign depends on the propagation direction, normally positive for a forward wave (although the prebuncher might be taken to operate in the backward-wave mode and would, for example, require a negative sign).

The bunching wavenumbers (equations [9] and [11]) become:

$$k_{bi} = k_{si}\cos(\theta_i) + k_{wi} \qquad [21]$$

and it is these bunching wave numbers ($\Delta k$ in equation [7] of above-referenced U.S. Pat. No. 4,697,272) that are related through equation [12] above. Thus:

$$k_{s2}\cos(\theta_2) + k_{w2} = n(k_{s1}\cos(\theta_1) + k_{w1}) \qquad [22]$$

It also follows from equations [12] and [19] that the signal wavenumber is near a harmonic of the prebuncher wavenumber:

$$k_{s2} = nk_{s1} \qquad [23]$$

Consequently, the wiggler wavenumbers reqired to secure the advantages of the present invention will not generally be in a harmonic ratio but may be derived by a numerical solution [20] of equations [22] and [23].

In order to more clearly set forth the ratio of the wiggler wavenumbers, in terms of the prebuncher parameters and the cutoff wavenumbers, equations [19°] and [20] may first be combined to yield:

$$k_{si} = \beta(\pm k_{si}(1 - (k_{ci}/k_{si})^2)^{\frac{1}{2}} + k_{wi}) \qquad [24]$$

or $$k_{wi} = k_{si}/\beta - (\pm)(k_{si}^2 - k_{ci}^2)^{\frac{1}{2}} \qquad [25]$$
$$= k_{si}(1/\beta - (\pm)(1 - k_{ci}/k_{si})^2)^{\frac{1}{2}}$$

Then the ratio of $k_{w2}/k_{w1}$ is given by $$k_{w2}/k_{w1} = [k_{s2}(1/\beta - (1 - (k_{c2}/k_{s2})^2)^{\frac{1}{2}})] \div \qquad [26]$$
$$[k_{s1}(1/\beta \pm (1 - (k_{c1}/k_{s1})^2)^{\frac{1}{2}})]$$

It follows from equations [9], [11], [23] and [26] that the ratio of the spatial period of the first wiggler $\lambda_{w1}$ to the spatial period of the second wiggler $\lambda_{w2}$ is:

$$\lambda_{w1}/\lambda_{w2} = k_{w2}/k_{w1} = n[1/\beta - (1 - (k_{c2}/nk_{s1})^2)^{\frac{1}{2}}] \div \qquad [27]$$
$$[1/\beta - (\pm)(1 - k_{c1}/k_{s1})^2)^{\frac{1}{2}}]$$

The ratio is near an integer n, but the additional correction factors do not normally cancel, even if the modes and the cutoff wavenumbers are identical. The scale of the correction is significant if the relative variation of the ideal $k_{w2}$, given by equation [26], differs from the harmonic of $k_{w1}$ by more than the relative gain-linewidth of the wiggler. The gain-linewidth of an FEL may approximately be taken to depend on the reciprocal of the number of wiggler periods, and subsequently, the gain and the efficiency of power generation will fall off rapidly if the correction exceeds this amount.

Thus, the present invention has been described herein with reference to a particular embodiment for a particular application. The invention may be regarded as providing a fast wave amplifier using prebunching to enhance the coupling strength of a short-wavelength wiggler. The advantageous method of the present invention may be implemented with a conventional free electron laser, traveling wave tube or other device coupled with an extraction stage wiggler having a spatial period which differs proportionately from the spatial period of the prebunching stage. Shorter wavelengths should be achievable with less wiggler field and lower operating voltage. The net gain of small signals should be higher permitting the design and construction of tunable amplifiers (and oscillators) having wide bandwidth and large gain, and short physical length. In addition to providing more compact sources of millimeter-wave to infrared radiation, FELs designed in accordance with the present teachings should be smaller with lighter power supplies.

Those having ordinary skill in the art and access to the present teachings will recognize additional modifications applications and embodiments within the scope thereof. For example, the prebuncher, 18, drift region, 24, and wiggler, 26, need not be separate and may be combined into the wiggler section. Also, due to the effective multiplication of the prebunching frequency by an FEL designed in accordance with the present teachings, it is further anticipated that such an FEL may be used as a frequency-multiplying amplifier, or as a two-frequency transmitter.

It is therefore intended by the appended claims to over any and all such applications, modifications and embodiments within the scope of the present invention.

Accordingly,

What is claimed is:

1. A method of employing free electron lasing action at a first frequency to achieve gain in output power at a second frequency comprising the steps of:

driving an electron beam with an electromagnetic wave at said first frequency in a first stage, said first stage having a first spatial period $\lambda_{w1}$, to cause bunching of the electron beam and oscillating the electrons in said bunched electron beam with a second stage having a second spatial period $\lambda_{w2}$ to generate electromagnetic wave power from said beam at said second frequency, wherein the spatial period of the second stage $\lambda_{w2}$ is related to the spatial period of the first stage $\lambda_{w1}$ by:

$$\lambda_{w1}/\lambda_{w2} = n[1/\beta - (1 - (k_{c2}/nk_{s1})^2)^{\frac{1}{2}}] \div$$
$$[1/\beta - (\pm)(1 - (k_{c1}/k_{s1})^2)^{\frac{1}{2}}]$$

where:

n = an integer, $\beta$ = the velocity v of the wave divided by the speed of light constant c;

$k_{s1}$ = the free-space signal wavenumber (proportional to the frequency of the radiation field) of the electromagnetic radiation of the first frequency within said first stage;

$k_{c1}$ = the cutoff wavenumber for radiation in the first stage;

$k_{c2}$ = the cutoff wavenumber for radiation in the second stage.

2. The invention of claim 1 wherein said second frequency is near harmonic of said first frequency.

3. The invention of claim 2 wherein first stage is a free electron laser.

4. The invention of claim 3 wherein said second stage is a wiggler.

5. The invention of claim 4 including the step of passing said electron beam through a drift region between said first stage and said second stage.

6. An upshifted free electron laser amplifier employing free electron lasing action at a first frequency to achieve gain in output power at a second frequency comprising:
 means for driving an electron beam with an electromagnetic wave at said first frequency in a first stage having a first spatial period $\lambda_{w1}$ to cause bunching of the electron beam and
 means for oscillating the electrons in said bunched electron beam with a second stage having a second spatial period $\lambda_{w2}$ to generate electromagnetic wave power from said beam at said second frequency with said second spatial period $\lambda_{w2}$ being related to $\lambda_{w1}$ by:

$$\lambda_{w1}/\lambda_{w2} = n[1/\beta - (1 - (k_{c2}/nk_{s1})^2)^{\frac{1}{2}}] \div$$

-continued $$[1/\beta - (\pm)(1 - (k_{c1}/k_{s1})^2)^{\frac{1}{2}}]$$

where:
 n = an integer,
 $\beta$ = the velocity v of the wave divided by the speed of light constant c;
 $k_{s1}$ = the free-space signal wavenumber (proportional to the frequency of the radiation field) of the electromagnetic radiation of the first frequency within said first stage;
 $k_{c1}$ = the cutoff wavenumber for radiation in the first stage;
 $k_{c2}$ = the cutoff wavenumber for radiation in the second stage.

7. The invention of claim 6 wherein said second frequency is near a harmonic of said first frequency.

8. The invention of claim 7 wherein first stage is a free electron laser.

9. The invention of claim 8 wherein said second stage is a wiggler.

10. The invention of claim 9 including a chamber providing a drift region between said first stage and said second stage.

* * * * *